(12) United States Patent
Tabata (10) Patent No.: US 11,685,320 B2
(45) Date of Patent: Jun. 27, 2023

(54) VEHICULAR RECORDING CONTROL APPARATUS, VEHICULAR RECORDING APPARATUS, VEHICULAR RECORDING CONTROL METHOD, AND COMPUTER PROGRAM

(71) Applicant: JVCKENWOOD Corporation, Yokohama (JP)

(72) Inventor: Kiyofumi Tabata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 9 days.

(21) Appl. No.: 16/986,315

(22) Filed: Aug. 6, 2020

(65) Prior Publication Data

US 2020/0369220 A1 Nov. 26, 2020

Related U.S. Application Data (63) Continuation of application No. PCT/JP2019/023036, filed on Jun. 11, 2019.

(30) Foreign Application Priority Data

Dec. 26, 2018 (JP) ................................ 2018-243050

(51) Int. Cl.
B60R 11/04 (2006.01)

(52) U.S. Cl.
CPC ......... B60R 11/04 (2013.01); *B60R 2300/105* (2013.01); *B60R 2300/8073* (2013.01)

(58) Field of Classification Search
None
See application file for complete search history.

(56) References Cited

U.S. PATENT DOCUMENTS 9,747,795 B1 * 8/2017 Espinosa .......... G08B 13/19647
10,131,323 B1 * 11/2018 Sterling ................. B60R 25/10
(Continued)

FOREIGN PATENT DOCUMENTS

| JP | 2004-276807 | 10/2004 |
|----|-------------|---------|
| JP | 2006-321357 | 11/2006 |

(Continued)

OTHER PUBLICATIONS

Japanese Office Action for Japanese Application No. 2018-243050 dated Feb. 4, 2020.
(Continued)

*Primary Examiner* — Rebecca A Volentine
(74) *Attorney, Agent, or Firm* — Amin, Turocy & Watson, LLP (57) ABSTRACT

Included are: a video data acquiring unit configured to acquire video data acquired by a plurality of image capturing units that capture images of surroundings of a vehicle; an event detector configured to detect an event concerning the vehicle; a parking detector configured to detect whether the vehicle is in a parked state; an object detector configured to detect a surrounding object present at a distance less than a certain distance from the vehicle while the vehicle is parked, and a recording function controller configured to, when the object detector detects a surrounding object present at a distance less than the certain distance from the vehicle while the vehicle is parked, perform recording due to the event detected by the event detector, using video data captured by a camera.

6 Claims, 5 Drawing Sheets

(56) References Cited

U.S. PATENT DOCUMENTS

| | | | |
|---|---|---|---|
| 2012/0140072 A1* | 6/2012 | Murashita | G06K 9/00805 |
| | | | 348/148 |
| 2018/0215344 A1* | 8/2018 | Santora | B60R 25/32 |
| 2020/0001827 A1* | 1/2020 | Shirazi | G08B 13/19695 |

FOREIGN PATENT DOCUMENTS

| | | |
|---|---|---|
| JP | 2007-282162 | 10/2007 |
| JP | 2009166737 A * | 7/2009 |
| JP | 2009-280109 | 12/2009 |
| JP | 5012527 | 8/2012 |
| JP | 2014-044692 | 3/2014 |
| JP | 2015-105070 | 6/2015 |
| JP | 2018-050221 | 3/2018 |
| KR | 2006-0026712 | 3/2006 |

OTHER PUBLICATIONS

International Search Report and Written Opinion for International Application No. PCT/JP2019/023036 dated Sep. 3, 2019, 9 pages.
Extended European Search Report for European Patent Application No. 19903505.6 dated Dec. 3, 2020.
European Office Action for European Patent Application No. 19903505.6 dated Jun. 18, 2021.

* cited by examiner

VEHICULAR RECORDING CONTROL APPARATUS, VEHICULAR RECORDING APPARATUS, VEHICULAR RECORDING CONTROL METHOD, AND COMPUTER PROGRAM

CROSS-REFERENCE TO RELATED APPLICATIONS

This application is a continuation of PCT international application Ser. No. PCT/JP2019/023036 filed on Jun. 11, 2019 which designates the United States, incorporated herein by reference, and which claims the benefit of priority from Japanese Patent Application No. 2018-243050, filed on Dec. 26, 2018, incorporated herein by reference.

BACKGROUND

1. Technical Field

The present disclosure relates to a vehicular recording control apparatus, a vehicular recording apparatus, a vehicular recording control method, and a computer program.

2. Description of the Related Art

What is called a driving recorder (vehicular recording apparatus) that captures images in the frontward and rearward directions of a vehicle is known. A driving recorder includes a frontward camera that captures images in the frontward direction of a vehicle, and a rearward camera that captures images in the rearward direction of the vehicle. A driving recorder saves video from a frontward camera and from a rearward camera, as event recording data, upon detection of an event.

A driving recorder that monitors parking records an event when acceleration of a magnitude not less than a threshold value acts on a vehicle or when a moving object is detected. When parking is monitored using a driving recorder including a plurality of cameras such as a frontward camera and a rearward camera, power consumption is higher and a period for which parking can be monitored may possibly be shorter than when parking is monitored by use of a single camera. Furthermore, the size of video captured by the plurality of cameras is larger than the size of video captured when parking is monitored by use of a single camera. Therefore, an upper limit up to which video can be saved as event recording data may possibly be insufficient.

SUMMARY

It is an object of the present disclosure to at least partially solve the problems in the conventional technology.

To solve the above problem and achieve the above object, a vehicular recording control apparatus according to the present disclosure comprising: a video data acquiring unit configured to acquire video data acquired by a plurality of image capturing units that capture images of surroundings of a vehicle; an event detector configured to detect an event concerning the vehicle; a parking detector configured to detect whether the vehicle is in a parked state; an object detector configured to detect a surrounding object present at a distance less than a certain distance from the vehicle at a position at which the vehicle is parked while the vehicle is parked, the surrounding object blocking entry of another vehicle or a person; and a recording function controller configured to, when the object detector detects a surrounding object present at a distance less than the certain distance from the vehicle while the vehicle is parked, perform recording due to the event detected by the event detector, on a recorder using video data captured by the image capturing unit, among the image capturing units, other than the image capturing unit that captures images in a direction in which the surrounding object is detected.

A vehicular recording apparatus according to the present disclosure comprising: the vehicular recording control apparatus above; and both a plurality of image capturing units and a recorder or either thereof, the plurality of image capturing units being configured to capture images of the surroundings of the vehicle, the recorder being configured to record the video data.

A vehicular recording control method according to the present disclosure for a vehicular recording control apparatus to execute: a parking detecting step of detecting whether a vehicle is in a parked state; an object detecting step of detecting a surrounding object present at a distance less than a certain distance from the vehicle at a position at which the vehicle is parked while the vehicle is parked, the surrounding object blocking entry of another vehicle or a person; an event detecting step of detecting an event concerning the vehicle; and a recording function controlling step of performing, when a surrounding object present at a distance less than the certain distance from the vehicle is detected at the object detecting step while the vehicle is parked, recording due to the event detected at the event detecting step, using video data captured by an image capturing unit, among a plurality of image capturing units configured to capture images of surroundings of the vehicle, other than the image capturing unit that captures images in a direction in which the surrounding object is detected.

A non-transitory computer readable recording medium storing therein a computer program according to the present disclosure causing a computer operating as a vehicular recording control apparatus to execute: a parking detecting step of detecting whether a vehicle is in a parked state; an object detecting step of detecting a surrounding object present at a distance less than a certain distance from the vehicle at a position at which the vehicle is parked while the vehicle is parked, the surrounding object blocking entry of another vehicle or a person; an event detecting step of detecting an event concerning the vehicle; and a recording function controlling step of performing, when a surrounding object present at a distance less than the certain distance from the vehicle is detected at the object detecting step while the vehicle is parked, recording due to the event detected at the event detecting step, using video data captured by an image capturing unit, among a plurality of image capturing units configured to capture images of surroundings of the vehicle, other than the image capturing unit that captures images in a direction in which the surrounding object is detected.

DETAILED DESCRIPTION

The following describes embodiments of a vehicular recording control apparatus, a vehicular recording apparatus, a vehicular recording control method, and a computer program according to the present disclosure in detail with reference to the accompanying drawings. The following embodiments are not intended to limit the present disclosure.

First Embodiment

Figure 1:
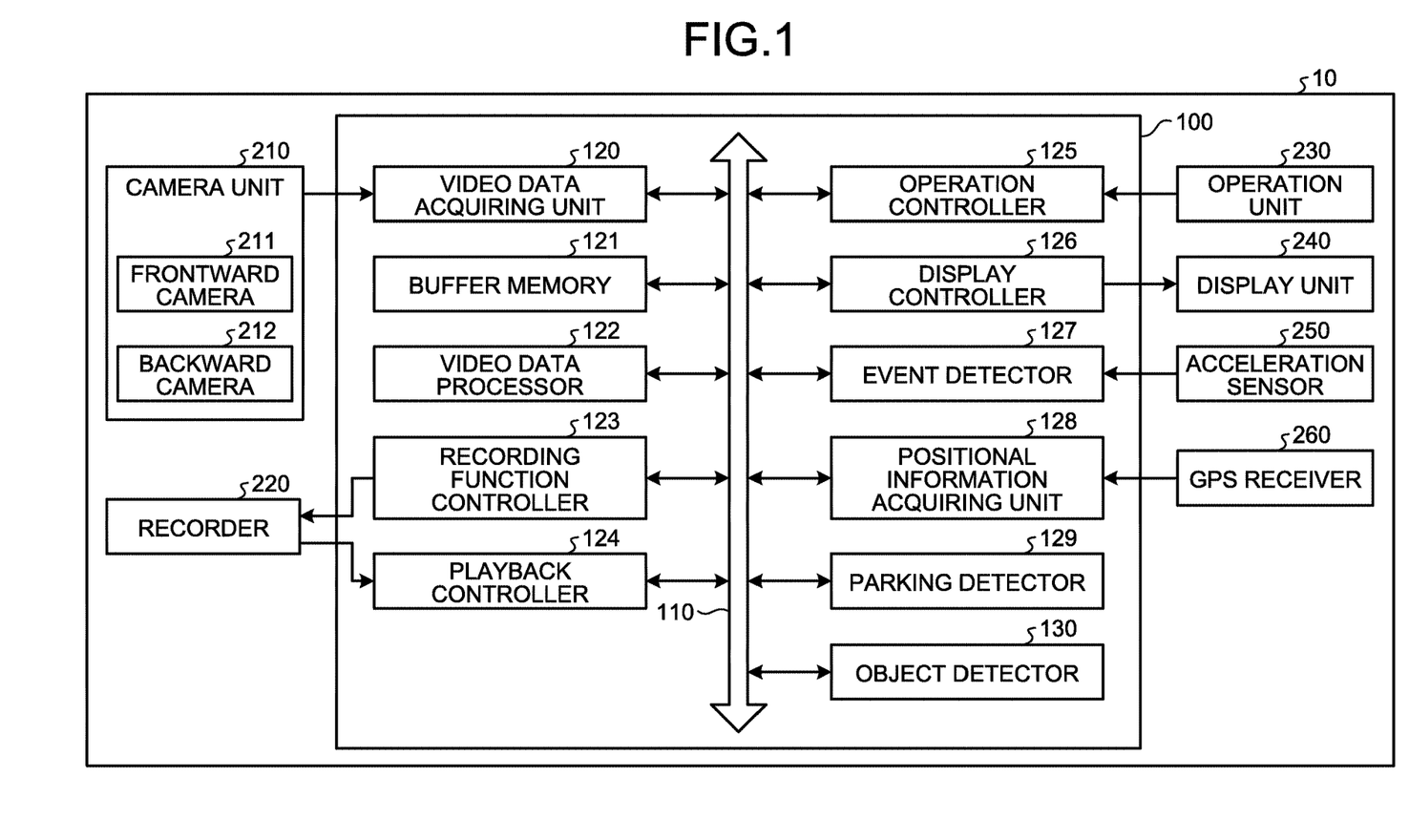
FIG. 1 is a block diagram illustrating a configuration example of a vehicular recording apparatus that includes a vehicular recording control apparatus according to a first embodiment.

FIG. 1 is a block diagram illustrating a configuration example of a vehicular recording apparatus that includes a vehicular recording control apparatus according to a first embodiment. A vehicular recording apparatus 10 appropriately monitors parking by use of at least one camera out of a plurality of cameras that is appropriate in accordance with the positional relation between a vehicle and a surrounding object.

A surrounding object is an object present in the surroundings of the vehicle while the vehicle is parked. A surrounding object physically separates the surroundings of the vehicle. A surrounding object blocks entry of another vehicle into the surroundings of the vehicle. A surrounding object is, for example, a garage, a wall, a fence, a car stop, a step height, or another object that another vehicle cannot easily climb over.

The vehicular recording apparatus 10 may be an apparatus fixedly mounted on the vehicle or may be a portable apparatus that can be used on the vehicle. The vehicular recording apparatus 10 may be implemented in such a manner as to include the function or the configuration of an apparatus previously installed on the vehicle or of a navigation apparatus. The vehicular recording apparatus 10 includes a camera unit (plurality of image capturing units) 210, a recorder 220, an operation unit 230, a display unit 240, an acceleration sensor 250, a global positioning system (GPS) receiver 260, and a vehicular recording control apparatus 100.

The camera unit 210 includes a plurality of cameras that captures images of the surroundings of the vehicle. The individual cameras capture images in different directions from the vehicle. In the present embodiment, the camera unit 210 includes a frontward camera 211 enabled to capture images in the frontward direction and a rearward camera 212 enabled to capture images in the rearward direction. The frontward camera 211 is arranged in, for example, a relatively front part of the vehicle interior of the vehicle. The rearward camera 212 is arranged in, for example, a relatively rear part of the vehicle interior of the vehicle. The following description refers to the cameras as the camera unit 210 when there is no need to differentiate therebetween. In the present embodiment, the camera unit 210 is capable of saving video upon detection of an event while an accessory power supply is off, in other words, while the vehicle is in a parked state. The video corresponds to a certain period the length of which is, for example, about a few tens of seconds. The camera unit 210 outputs captured video data to a video data acquiring unit 120 in the vehicular recording control apparatus 100. The video data is, for example, moving images composed of images, the frame rate of which is 30 frames per second. Under the control of the vehicular recording control apparatus 100, the camera unit 210 actuates all or some of the cameras selected out of the cameras included in the camera unit 210 and outputs, to the video data acquiring unit 120, video data captured by the at least one camera thus actuated.

The recorder 220 is used for, for example, temporarily storing data in the vehicular recording apparatus 10. The recorder 220 is a recorder such as a semiconductor memory device, the examples of which include a random access memory (RAM) and a flash memory, or a memory card. Alternatively, the recorder 220 may be an external recorder wirelessly connected via a communication apparatus not illustrated. The recorder 220 records therein loop-recorded video data or event recording data based on a control signal output from a recording function controller 123 in the vehicular recording control apparatus 100.

The operation unit 230 is capable of receiving various operations performed on the vehicular recording apparatus 10. For example, the operation unit 230 is capable of receiving an operation for manually saving, as event recording data, captured video data in the recorder 220. For example, the operation unit 230 is capable of receiving an operation for playing back loop-recorded video data or event recording data recorded in the recorder 220. For example, the operation unit 230 is capable of receiving an operation for deleting event recording data recorded in the recorder 220. For example, the operation unit 230 is capable of receiving an operation for ending loop recording. The operation unit 230 outputs operational information to an operation controller 125 in the vehicular recording control apparatus 100.

The display unit 240 is, as an example, a display apparatus dedicated to the vehicular recording apparatus 10 or a display apparatus shared with other systems including a navigation system. The display unit 240 may be formed integrally with the camera unit 210. The display unit 240 is, for example, a display including a liquid crystal display (LCD) or an organic electro-luminescence (EL) display. In the present embodiment, the display unit 240 is arranged on a dashboard, an instrument panel, or a center console in front of a driver in the front part of the vehicle. The display unit 240 displays video based on a video signal output from a display controller 126 in the vehicular recording control apparatus 100. The display unit 240 displays video that is being captured by the camera unit 210 or video that has been recorded in the recorder 220.

The acceleration sensor 250 is a sensor that detects acceleration acting on the vehicle. The acceleration sensor 250 outputs a detection result to an event detector 127 in the vehicular recording control apparatus 100. The acceleration sensor 250 is, for example, a sensor that detects acceleration in triaxial directions. The triaxial directions are the frontward or rearward direction, the leftward or rightward direction, and the upward or downward direction of the vehicle.

The GPS receiver 260 receives radio waves from a GPS satellite not illustrated. The GPS receiver 260 outputs a signal of a received radio wave to a positional information acquiring unit 128 in the vehicular recording control apparatus 100.

The vehicular recording control apparatus 100 is, for example, an arithmetic processing unit (control apparatus)

composed of components such as a central processing unit (CPU). The vehicular recording control apparatus 100 loads a stored computer program onto a memory and executes instructions contained in the computer program. The vehicular recording control apparatus 100 includes an internal memory not illustrated, and the internal memory is used for temporarily storing data in the vehicular recording control apparatus 100, for example. The vehicular recording control apparatus 100 includes the video data acquiring unit 120, a buffer memory 121, a video data processor 122, the recording function controller 123, a playback controller 124, the operation controller 125, the display controller 126, the event detector 127, the positional information acquiring unit 128, a parking detector 129, and an object detector 130, all connected to a bus 110.

The video data acquiring unit 120 acquires video data obtained by capturing images of the surroundings of the vehicle. More specifically, the video data acquiring unit 120 acquires video data output by the camera unit 210 and outputs the video data to the buffer memory 121. The video data acquiring unit 120 acquires video data captured by all or some of the cameras selected and thus actuated out of the cameras included in the camera unit 210.

The buffer memory 121 is an internal memory included in the vehicular recording control apparatus 100 and is a memory that temporarily records therein video data of a certain length of time acquired by the video data acquiring unit 120 while successively updates recorded video data.

The video data processor 122 converts, into a desired file format, video data temporarily stored in the buffer memory 121. The desired file format is, for example, the MP4 format obtained through coding with a codec compliant with a desired method such as H.264 or Moving Picture Experts Group (MPEG)-4. The video data processor 122 generates, from video data temporarily stored in the buffer memory 121, video data segmented as files each corresponding to a certain length of time. As a specific example, the video data processor 122 generates, from video data temporarily stored in the buffer memory 121, video data segmented as files each corresponding to a time period of 60 seconds in chronological order of the recording. The video data processor 122 outputs the generated video data to the recording function controller 123. The video data processor 122 outputs the generated video data also to the display controller 126. The period to which video data generated as a file corresponds is described as 60 seconds as an example but is not limited to this example. Video data as used herein may be data that contains sound along with video captured by the camera unit 210.

The recording function controller 123 performs control over recording in the recorder 220 of video data segmented as files by the video data processor 122. During a period in which loop recording is executed, such as a period in which the accessory power supply of the vehicle is on, the recording function controller 123 records video data segmented as files by the video data processor 122, as video data that can be overwritten, in the recorder 220. More specifically, during a period in which loop recording is executed, the recording function controller 123 continues to record, in the recorder 220, video data generated by the video data processor 122 and records new video data in such a manner as to overwrite the oldest video data therewith once the capacity of the recorder 220 is used up.

Upon detection of an event by the event detector 127, the recording function controller 123 saves video data corresponding to a certain period generated by the video data processor 122, as write-protected event recording data, in the recorder 220.

When capturing of video is started upon detection of an event, saved as event recording data in the recorder 220 by the recording function controller 123 is video data for a certain period that is, for example, about not less than 10 seconds and not more than 60 seconds after the capturing is started upon the detection of the event. During a period in which loop recording is executed, saved as event recording data in the recorder 220 by the recording function controller 123 is video data for a certain period that is about not less than 10 seconds and not more than 60 seconds, the center of which corresponds to the time when the event is detected.

While the accessory power supply of the vehicle is off, in other words, while the vehicle is in a parked state, the recording function controller 123 puts a parking monitoring function into operation, thereby saving video data captured by the camera unit 210. More specifically, the parking monitoring function detects an event and saves video data through loop recording. Otherwise, the parking monitoring function actuates the camera unit 210 and then saves video data upon detection of an event.

The recording function controller 123 controls the parking monitoring function in accordance with the positional relation between the vehicle and the surrounding object. When the object detector 130 detects a surrounding object at a distance less than a certain distance from the vehicle while the vehicle is parked, recording due to an event detected by the event detector 127 is performed by the recording function controller 123 using video data captured by a camera in the camera unit 210 other than a camera capturing images in a direction (hereinafter referred to as "surrounding object direction") in which the surrounding object is detected.

A camera other than for the surrounding object direction means a camera that is included in the camera unit 210 and that captures images in a range of directions that include a direction other than the surrounding object direction. For example, when the surrounding object direction is the frontward direction of the vehicle, a camera other than for the surrounding object direction is the rearward camera 212, which captures images in a range of directions that include a direction other than the frontward direction.

More specifically, when a surrounding object is detected at a distance less than the certain distance from the vehicle, the recording function controller 123 causes a camera other than a camera capturing images in the surrounding object direction in the camera unit 210 to capture video. Having a surrounding object present rules out the possibility that another vehicle may approach and collide with the vehicle along the surrounding object direction. The recording function controller 123 thus needs only to cause the camera other than for the surrounding object direction in the camera unit 210 to capture video. Based on detection of an event by the event detector 127, the recording function controller 123 then saves, as event recording data, video data captured by the camera other than for the surrounding object direction in the camera unit 210.

When having detected no surrounding object at a distance less than the certain distance from the vehicle, the recording function controller 123 causes all of the cameras in the camera unit 210 to capture video. With no surrounding object present, there is a possibility that another vehicle may approach and collide with the vehicle along any direction. It is therefore preferable that the recording function controller 123 cause all of the cameras to capture video. Based on detection of an event by the event detector 127, the recording function controller 123 then saves, as event recording data, video data captured by all of the cameras.

Based on a control signal for a playback operation output from the operation controller 125, the playback controller 124 performs control so as to play back loop-recorded video data or event recording data recorded in the recorder 220.

The operation controller 125 acquires operational information on an operation received by the operation unit 230. For example, the operation controller 125 outputs a control signal upon acquiring any one of the following: saving operation information indicating an operation for manually saving video data; playback operation information indicating a playback operation; and a deletion operation information indicating an operation for deleting video data. For example, the operation controller 125 outputs a control signal upon acquiring exit operation information indicating an operation for exiting loop recording.

The display controller 126 controls displaying of video data on the display unit 240. The display controller 126 outputs a video signal that causes video data to be output to the display unit 240. More specifically, the display controller 126 outputs a video signal to be displayed by playing back video that the camera unit 210 is capturing or either loop-recorded video data or event recording data recorded in the recorder 220.

Based on a detection result from the acceleration sensor 250, the event detector 127 detects an event concerning the vehicle. More specifically, the event detector 127 detects, as an event, when acceleration of a magnitude not less than a threshold value is detected from acceleration detected by the acceleration sensor 250. The threshold value used for detecting an event while parking is recorded may be set smaller than a threshold value used for detecting an event while the vehicle travels. For example, when the threshold value for acceleration based on which an event is detected while the vehicle travels is, for example, about 1 G, the threshold value for acceleration based on which an event is detected while parking is recorded may be set to about 0.3 G.

Based on radio waves received by the GPS receiver 260, the positional information acquiring unit 128 calculates positional information on the vehicle using a publicly known method.

Based on information acquired from the vehicle, a parking detector 129 detects whether the vehicle is in a parked state.

That the vehicle is in a parked state indicates a state in which the shift position has been set to "parking", the parking brake has been activated, the speed has been zero, for example, at least 5 seconds, or the engine has been stopped. In addition, when a desired trigger such as a user operation takes place, the vehicle may be determined to be in a parked state.

While the vehicle is parked, the object detector 130 detects a surrounding object that is present at a distance less than the certain distance from the vehicle at a position at which the vehicle is parked and that blocks entry of another vehicle. The certain distance is, for example, about 2 meters. The object detector 130 detects a direction from the vehicle in which the surrounding object is detected.

The object detector 130 may, for example, output radio waves other than visible light toward the surroundings of the vehicle and detect an object based on a detection result from a sensor that detects an object using reflected waves of the radio waves. The object detector 130 may, for example, detect an object based on a detection result from an infrared sensor, an ultrasound sensor, or a millimeter-wave radar. The object detector 130 may, for example, detect an object by performing image processing on video data captured by the camera unit 210. The object detector 130 may, for example, detect an object based on the positional information acquired by the positional information acquiring unit 128 and map information acquired by the navigation system. The object detector 130 may be any desirable device capable of detecting an object.

The vehicular recording apparatus 10 continuously records video to perform what is called loop recording and conducts event detection throughout a period from the start to stop of the engine, that is, while the vehicle is not in a parked state and is in operation. While the accessory power supply is off, in other words, while the vehicle is in a parked state, the vehicular recording apparatus 10 performs either of the following: continuous recording of video, that is, what is called loop recording, and event detection at the same time, provided that the vehicular recording apparatus 10 has power supplied to any other power supply than the accessory power supply from the battery of the vehicle; and event detection and video capturing upon detection of an event, provided that the vehicular recording apparatus 10 is being operated with a battery dedicated thereto.

Figure 2:
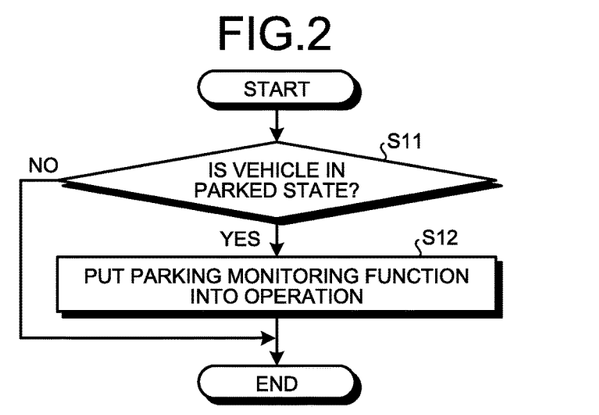
FIG. 2 is a flowchart illustrating the procedure of processing in the vehicular recording control apparatus according to the first embodiment.

Next, the procedure of processing in the vehicular recording control apparatus 100 is described using FIG. 2. FIG. 2 is a flowchart illustrating the procedure of processing in the vehicular recording control apparatus according to the first embodiment.

The vehicular recording control apparatus 100 determines, using the parking detector 129, whether the vehicle is in a parked state (step S11). If it is determined, using the parking detector 129, that the vehicle is in a parked state (Yes at step S11), the vehicular recording control apparatus 100 shifts the processing to step S12. If it is determined, using the parking detector 129, that the vehicle is not in a parked state (No at step S11), the vehicular recording control apparatus 100 ends the present processing. Before the determination results in Yes at step S11 in the processing of FIG. 2, and after the processing of FIG. 2 ends, the vehicle is not in a parked state, and event detection intended for a period in which the vehicle travels is performed.

If it is determined that the vehicle is in a parked state (Yes at step S11), the vehicular recording control apparatus 100 puts the parking monitoring function into operation (step S12). The vehicular recording control apparatus 100 ends the present processing.

Figure 3:
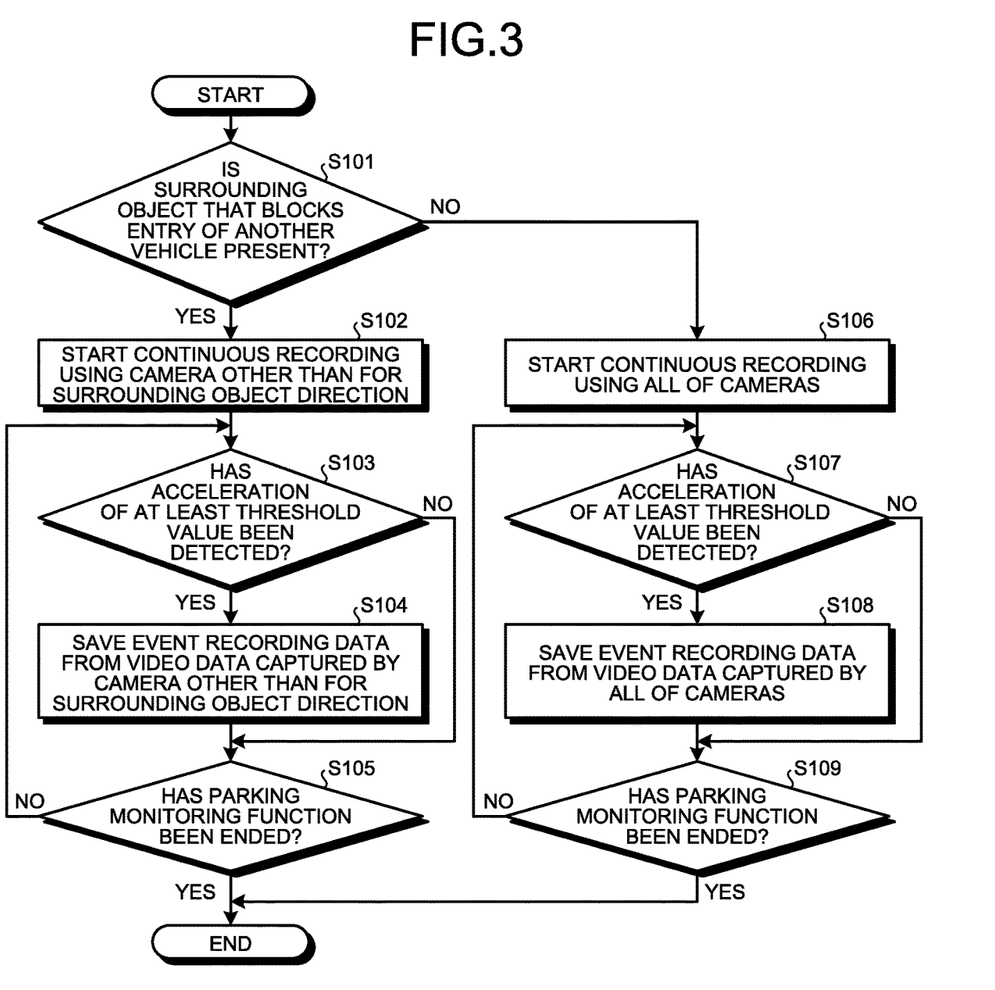
FIG. 3 is a flowchart illustrating the procedure of processing in the vehicular recording control apparatus according to the first embodiment.

Next, the procedure of processing for detecting an event and saving video data through loop recording is described using FIG. 3 as an example of the parking monitoring function. FIG. 3 is a flowchart illustrating the procedure of processing in the vehicular recording control apparatus according to the first embodiment. In the processing illustrated in FIG. 3, based on event detection, video data corresponding to a certain period including, and before and after, a detection time point when the event is detected is saved as event detection data in the recorder 220 from video data that is being loop-recorded.

The processing of FIG. 3 is started by having the parking monitoring function put into operation at step S12 in the flowchart illustrated in FIG. 2.

The vehicular recording control apparatus 100 determines whether a surrounding object that blocks entry of another vehicle is present at a distance less than the certain distance from the vehicle (step S101). More specifically, if it is determined that a surrounding object that blocks entry of another vehicle is present (Yes at step S101) because a detection result from the object detector 130 indicates that a surrounding object that blocks entry of another vehicle is present at a distance less than the certain distance from the vehicle, the vehicular recording control apparatus 100 shifts the processing to step S102. The object detection that the object detector 130 performs for the determination at step S101 may be based on a detection result immediately before the vehicle is parked or may be detected after the vehicle is parked. If it is not determined that a surrounding object that blocks entry of another vehicle is present (No at step S101) because a detection result from the object detector 130 does not indicate that a surrounding object that blocks entry of another vehicle is present at a distance less than the certain distance from the vehicle, the vehicular recording control apparatus 100 shifts the processing to step S106.

If it is determined at step S101 that a surrounding object that blocks entry of another vehicle is present at a distance less than the certain distance from the vehicle (Yes at step S101), the vehicular recording control apparatus 100 starts continuous recording using a camera other than for the surrounding object direction in the camera unit 210 (step S102). More specifically, the vehicular recording control apparatus 100 starts event detection based on output from the acceleration sensor 250 at the same time as causing the recording function controller 123 to start loop recording using video data captured by the camera other than for the surrounding object direction (step S102) and shifts the processing to step S103.

The vehicular recording control apparatus 100 determines whether acceleration of a rate not less than a threshold value has been detected (step S103). More specifically, if acceleration of a magnitude not less than the threshold value has been detected by the event detector 127, the vehicular recording control apparatus 100 determines that an event has been detected (Yes at step S103) and shifts the processing to step S104. If acceleration of a magnitude not less than the threshold value has not been detected by the event detector 127, the vehicular recording control apparatus 100 determines that an event has not been detected (No at step S103) and shifts the processing to step S105.

If acceleration of a magnitude not less than a threshold value has been detected (Yes at step S103), the vehicular recording control apparatus 100 saves event recording data from video data captured by a camera other than for the surrounding object direction in the camera unit 210 (step S104). More specifically, the vehicular recording control apparatus 100 generates, as event recording data, video data that has been captured for a certain period including, and before and after, the event detection time point and that has been acquired by the video data processor 122 from the camera other than for the surrounding object direction. If it is determined that a certain length of time has passed, the vehicular recording control apparatus 100 causes the recording function controller 123 to save, in the recorder 220, the event recording data generated by the video data processor 122 and shifts the processing to step S105.

The vehicular recording control apparatus 100 determines whether the parking monitoring function has been ended (step S105). Conditions that result in determination that the parking monitoring function has been ended include that the accessory power supply has been turned on and that the parking monitoring function has been stopped by the operation unit 230.

If it is determined at step S105 that the parking monitoring function has been ended (Yes at step S105), the present processing is ended. If it is determined that the parking monitoring function has not been ended (No at step S105), the present processing is returned to step S103.

If it is not determined at step S101 that a surrounding object that blocks entry of another vehicle is present at a distance less than the certain distance from the vehicle (No at step S101), the vehicular recording control apparatus 100 starts continuous recording using video data captured by all of the cameras in the camera unit 210 (step S106). More specifically, the vehicular recording control apparatus 100 starts event detection based on output from the acceleration sensor 250 at the same time as causing the recording function controller 123 to start loop recording using video data captured by all of the cameras in the camera unit 210 (step S106) and shifts the processing to step S107.

At step S107, the same processing as the processing at step S103 is performed.

If acceleration of a magnitude not less than a threshold value has been detected at step S107 (Yes at step S107), the vehicular recording control apparatus 100 saves event recording data from video data captured by all of the cameras in the camera unit 210 (step S108). More specifically, the vehicular recording control apparatus 100 generates, as event recording data, video data that has been captured for a certain period including, and before and after, the event detection time point and that has been acquired by the video data processor 122 from all of the cameras in the camera unit 210. If it is determined that a certain length of time has passed, the vehicular recording control apparatus 100 causes the recording function controller 123 to save, in the recorder 220, the event recording data generated by the video data processor 122 and shifts the processing to step S109.

At step S109, the same processing as the processing at step S105 is performed.

Figure 4:
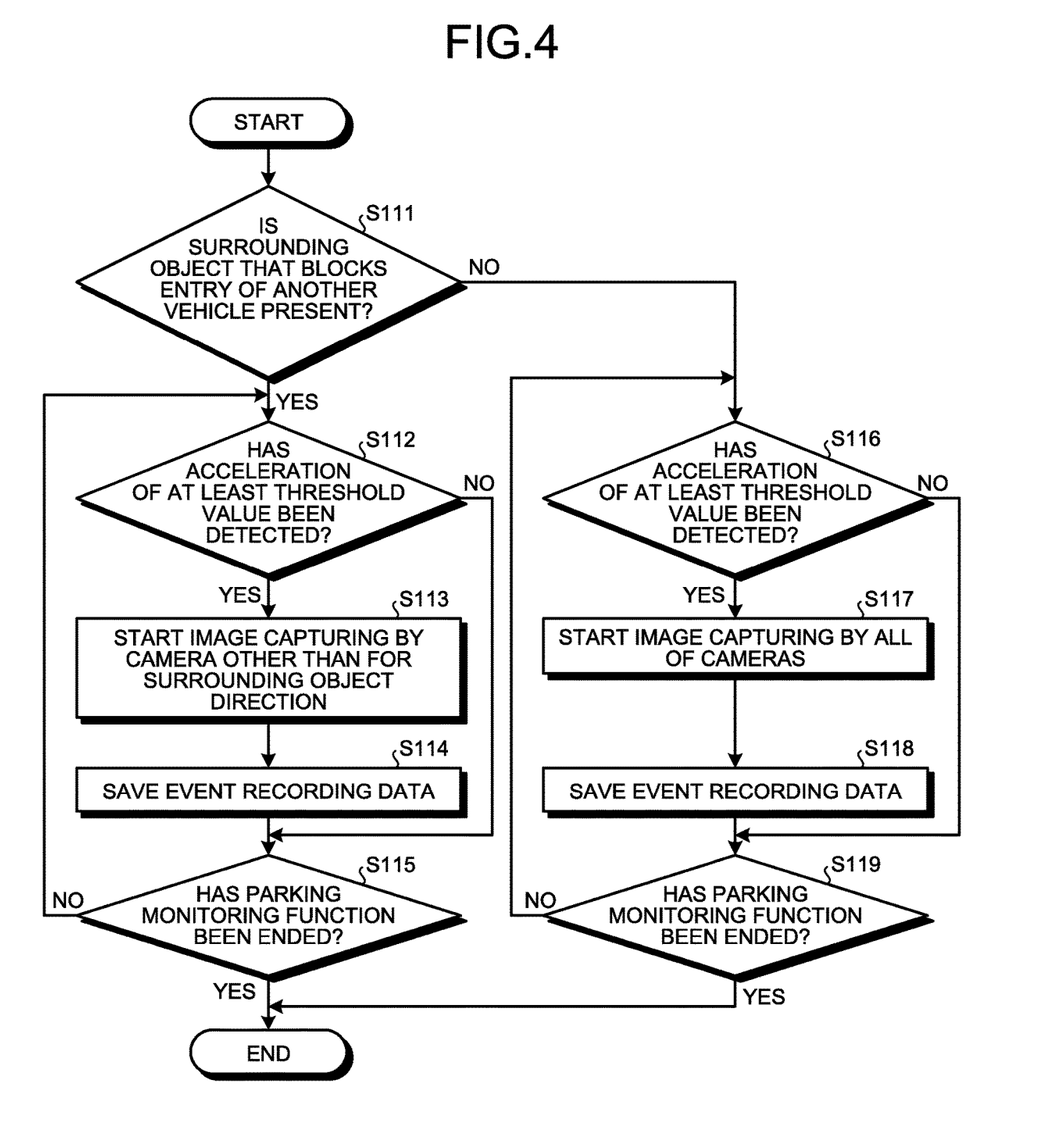
FIG. 4 is a flowchart illustrating the procedure of processing in the vehicular recording control apparatus according to the first embodiment.

Next, the procedure of processing for actuating a camera and saving video data after an event is detected is described using FIG. 4 as another example of the parking monitoring function. FIG. 4 is a flowchart illustrating the procedure of processing in the vehicular recording control apparatus according to the first embodiment. In the processing illustrated in FIG. 4, the camera unit 210 is actuated based on event detection, and video data for a certain period after an event is detected is saved as event recording data in the recorder 220.

The processing of FIG. 4 is started by having the parking monitoring function put into operation at step S12 in the flowchart illustrated in FIG. 2. The same processing as the processing at step S101, step S103, step S105, step S107, and step S109 in FIG. 3 is performed at step S111, step S112, step S115, step S116, and step S119 in FIG. 4.

After determining that a surrounding object that blocks entry of another vehicle is present, if acceleration of a magnitude not less than a threshold value has been detected at step S112 (Yes at step S112), the vehicular recording control apparatus 100 causes the recording function controller 123 to start image capturing by a camera other than for the surrounding object direction in the camera unit 210 (step S113) and shifts the processing to step S114.

The vehicular recording control apparatus 100 causes the recording function controller 123 to save video data captured by a camera other than for the surrounding object direction in the camera unit 210, as event recording data, in the recorder 220 (step S114) and shifts the processing to step S115. The event recording data saved at step S114 is video data corresponding to a period between when the image capturing is started at step S113 and when the recording is ended following determination that the certain period has passed.

After determining that no surrounding object that blocks entry of another vehicle is present, if acceleration of a magnitude not less than the threshold value has been detected at step S116 (Yes at step S116), the vehicular recording control apparatus 100 causes the recording function controller 123 to start image capturing by all of the cameras in the camera unit 210 (step S117) and shifts the processing to step S118.

The vehicular recording control apparatus 100 causes the recording function controller 123 to save video data captured by all of the cameras in the camera unit 210, as event recording data, in the recorder 220 (step S118) and shifts the processing to step S119. The event recording data saved at step S118 is video data corresponding to a period between when the image capturing is started at step S117 and when the recording is ended following determination that the certain period has passed.

Thus, when a surrounding object that blocks entry of another vehicle into the surroundings of the vehicle is detected, the parking monitoring function is put into operation with the camera, other than for the surrounding object direction in the camera unit 210, capturing video. When no surrounding object is detected, the parking monitoring function is put into operation with all of the cameras in the camera unit 210 capturing video.

As described above, in the present embodiment, when a surrounding object that blocks entry of another vehicle into the surroundings of the vehicle is detected, the parking monitoring function can be put into operation with a camera, other than for the surrounding object direction in the camera unit 210, capturing video. In the present embodiment, when no surrounding object is detected, the parking monitoring function can be put into operation with all of the cameras in the camera unit 210 capturing video. According to the present embodiment, parking can be appropriately monitored using an appropriate camera in the camera unit 210 in accordance with the positional relation between the vehicle and a surrounding object.

In the present embodiment, the camera unit 210 does not capture images in the surrounding object direction, in other words, in a direction along which no other vehicle may possibly approach and collide with the vehicle. In the present embodiment, the camera unit 210 captures images in a direction other than the surrounding object direction, in other words, in a direction along which another vehicle may possibly approach and collide with the vehicle. In the present embodiment, upon detection of a surrounding object, only a camera enabled to capture video in a direction along which another vehicle may possibly approach is actuated. As a result, parking can be monitored with reduced power consumption and for a longer length of time.

In the present embodiment, only a camera enabled to capture video in a direction along which another vehicle may possibly approach and collide is caused to operate, and video is then saved. As a result, the size of video data to be saved in the recorder 220 can be reduced.

Second Embodiment

Figure 5:
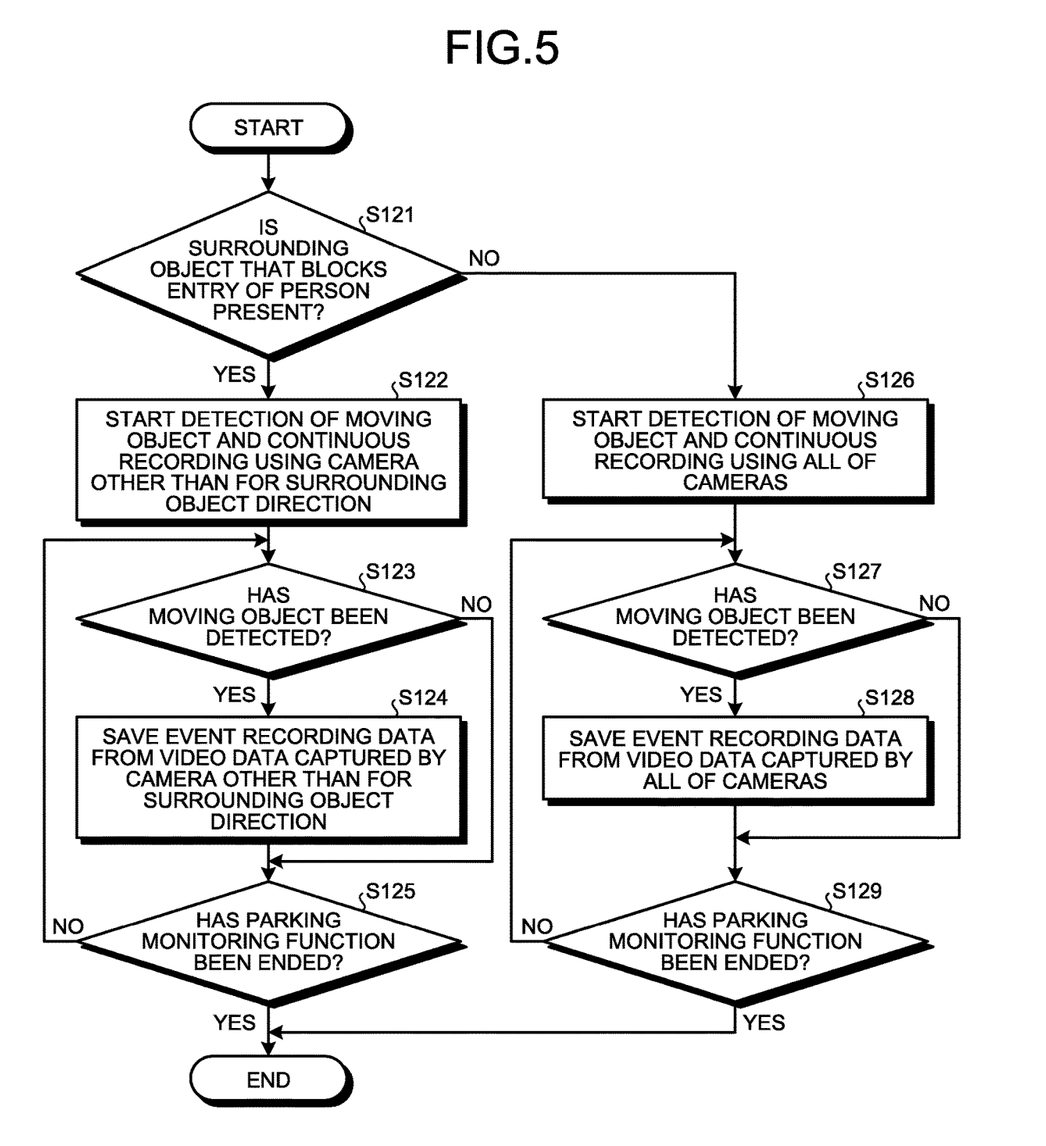
FIG. 5 is a flowchart illustrating the procedure of processing in a vehicular recording control apparatus according to a second embodiment.
Figure 6:
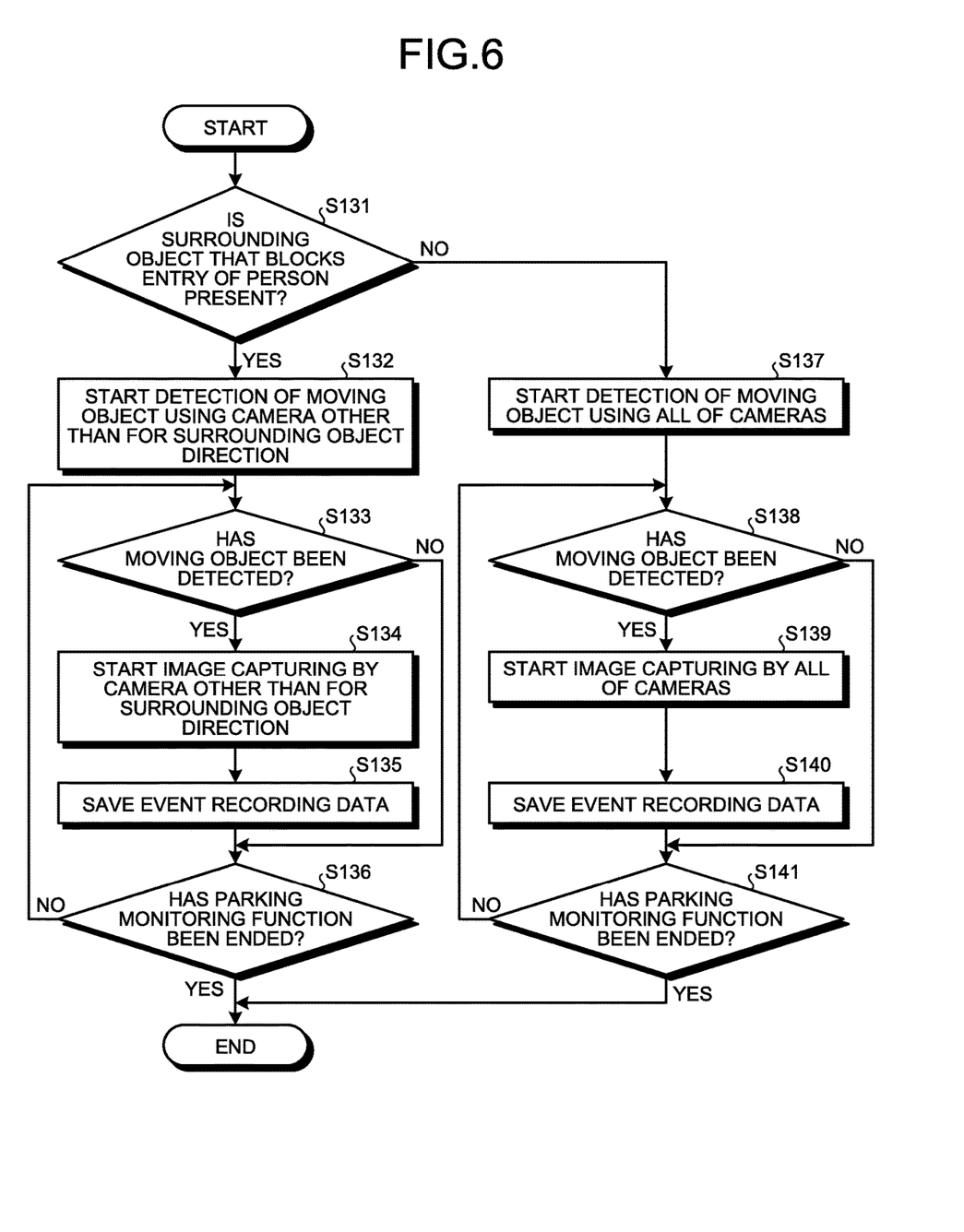
FIG. 6 is a flowchart illustrating the procedure of processing in a vehicular recording control apparatus according to the second embodiment.

The vehicular recording apparatus 10 according to the present embodiment is described with reference to FIG. 5 and FIG. 6. FIG. 5 is a flowchart illustrating the procedure of processing in a vehicular recording control apparatus according to a second embodiment. FIG. 6 is a flowchart illustrating the procedure of processing in a vehicular recording control apparatus according to the second embodiment. The vehicular recording apparatus 10 has the same basic configuration as the vehicular recording apparatus 10 in the first embodiment has. In the following description, the same constituent elements as those of the vehicular recording apparatus 10 are assigned the same reference signs. In the vehicular recording apparatus 10, processing in the event detector 127 and the object detector 130 is different from the corresponding processing in the first embodiment.

In the present embodiment, a surrounding object is an object that blocks entry of a person into the surroundings of the vehicle. A surrounding object is, for example, a garage, a wall, a fence, or an object that a person cannot easily climb over.

The event detector 127 detects, as an event, when a moving object in the surroundings of the vehicle is detected. More specifically, the event detector 127 detects the moving object by performing image processing on video data captured by the camera unit 210. A method to be used for detecting the moving object from video data may be any publicly known technique and is not particularly limited.

A moving object is, for example, an object that moves such as a vehicle, a person, a falling object, or a flying object.

While the vehicle is parked, the object detector 130 detects a surrounding object that is present at a distance less than the certain distance from the vehicle at a position at which the vehicle is parked and that blocks entry of a person.

Next, the procedure of processing for detecting an event and saving video data through loop recording is described using FIG. 5 as an example of the parking monitoring function. In the processing illustrated in FIG. 5, based on event detection, video data of a certain period including and before and after a detection time point when the event is detected is saved as event detection data in the recorder 220 from video data that is being loop-recorded.

The processing of FIG. 5 is started by having the parking monitoring function put into operation at step S12 in the flowchart illustrated in FIG. 2. The same processing as the processing at step S104, step S105, step S108, and step S109 in FIG. 3 is performed at step S124, step S125, step S128, and step S129 in FIG. 5.

The vehicular recording control apparatus 100 determines whether any surrounding object that blocks entry of a person is present at a distance less than the certain distance from the vehicle (step S121). More specifically, if it is determined that a surrounding object that blocks entry of a person is present (Yes at step S121) because a detection result from the object detector 130 indicates that a surrounding object that blocks entry of a person is present, the vehicular recording control apparatus 100 shifts the processing to step S122. The object detection to be performed by the object detector 130 for the determination at step S121 may be based on a detection result immediately before the vehicle is parked or may be detected after the vehicle is parked. If it is not determined that a surrounding object that blocks entry of a person is present (No at step S121) because a detection result from the object detector 130 does not indicate that any surrounding object that blocks entry of a person is present, the vehicular recording control apparatus 100 shifts the processing to step S126.

If, at step S121, any surrounding object that blocks entry of a person is determined to be present at a distance less than a certain distance from the vehicle (Yes at step S121), the vehicular recording control apparatus 100 starts detection of a moving object using a camera other than for the surrounding object direction in the camera unit 210 and continuous recording (step S122). More specifically, the vehicular recording control apparatus 100 starts event detection based on video data captured by the camera other than for the surrounding object direction at the same time as starting, using the recording function controller 123, loop recording with the camera other than for the surrounding object direction and shifts the processing to step S123.

The vehicular recording control apparatus 100 determines whether a moving object has been detected (step S123). More specifically, if a moving object in the surroundings of the vehicle has been detected by the event detector 127, the vehicular recording control apparatus 100 determines that an event has been detected (Yes at step S123) and shifts the processing to step S124. If no moving object in the surroundings of the vehicle has been detected by the event detector 127, the vehicular recording control apparatus 100 determines that no event has been detected (No at step S123) and shifts the processing to step S125.

If it is not determined at step S121 that a surrounding object that blocks entry of a person is present at a distance less than the certain distance from the vehicle (No at step S121), the vehicular recording control apparatus 100 starts detection of a moving object using all of the cameras in the camera unit 210 and continuous recording (step S126). More specifically, the vehicular recording control apparatus 100 starts event detection based on video data captured by all of the cameras at the same time as causing the recording function controller 123 to perform loop recording with all of the cameras and shifts the processing to step S127.

At step S127, the same processing as the processing at step S123 is performed.

Next, the procedure of processing for actuating a camera and saving video data after an event is detected is described using FIG. 6 as another example of the parking monitoring function. In the processing illustrated in FIG. 6, the camera unit 210 is actuated based on event detection, and video data for a certain period after an event is detected is saved as event recording data in the recorder 220.

The processing of FIG. 6 is started by having the parking monitoring function put into operation at step S12 in the flowchart illustrated in FIG. 2. The same processing as the processing at step S121, step S123, step S125, step S127, and step S129 in FIG. 5 is performed at step S131, step S133, step S136, step S138, and step S141 in FIG. 6. The same processing as the processing at step S114 and step S118 in FIG. 4 is performed at step S135 and step S140 in FIG. 6.

If it is determined at step S131 that a surrounding object that blocks entry of a person is present at a distance less than the certain distance from the vehicle (Yes at step S131), the vehicular recording control apparatus 100 causes the recording function controller 123 to start detection of a moving object using a camera other than for the surrounding object direction in the camera unit 210 (step S132) and shifts the processing to step S133.

If it is determined that a moving object surrounding the vehicle is present (Yes at step S133), the vehicular recording control apparatus 100 causes the recording function controller 123 to start image capturing by a camera other than for the surrounding object direction in the camera unit 210 to (step S134) and shifts the processing to step S135.

If it is determined at step S131 that no surrounding object that blocks entry of a person is present at a distance less than the certain distance from the vehicle (No at step S131), the vehicular recording control apparatus 100 causes the recording function controller 123 to start detection of a moving object using all of the cameras in the camera unit 210 (step S137) and shifts the processing to step S138.

If a moving object surrounding the vehicle has been detected (Yes at step S138), the vehicular recording control apparatus 100 causes the recording function controller 123 to start image capturing by all of the cameras in the camera unit 210 (step S139) and shifts the processing to step S140.

As described above, in the present embodiment, when a surrounding object that blocks entry of a person into the surroundings of the vehicle is detected, the parking monitoring function can be put into operation with a camera, other than for the surrounding object direction in the camera unit 210, capturing video. In the present embodiment, when no surrounding object is detected, the parking monitoring function can be put into operation with all of the cameras in the camera unit 210 capturing video.

In the present embodiment, the camera unit 210 does not capture images in the surrounding object direction, in other words, in a direction along which no person may possibly approach and collide with the vehicle. In the present embodiment, the camera unit 210 captures images in a direction other than the surrounding object direction, in other words, in a direction along which a person may possibly approach and collide with the vehicle. Thus, in the present embodiment, only a camera enabled to capture video in a direction along which a person may possibly approach is actuated when the parking monitoring function is put into operation. As a result, power consumption can be reduced.

In the present embodiment, only a camera enabled to capture video in a direction along which a person may possibly approach is actuated, and video is then saved. As a result, the size of video data to be saved in the recorder 220 can be reduced.

The vehicular recording apparatus 10 according to the present disclosure may be implemented in various different forms other than the above-described embodiments.

The individual constituent elements of the vehicular recording apparatus 10 illustrated are functionally conceptual and does not necessarily need to be physically configured as illustrated. That is, specific forms of the individual apparatuses are not limited to those illustrated, and all or some of the individual apparatuses may be functionally or physically distributed or integrated in any desirable units in accordance with respective processing loads of the apparatuses and how the apparatuses are used.

The configurations for the vehicular recording apparatus 10 are implemented, for example, as software, by forms such as computer programs loaded on memory. In the above embodiments, the configurations are described as functional blocks implemented by cooperation of these pieces of hardware or software. That is, these functional blocks can be implemented by any one of such various forms as only hardware, only software, and a combination of hardware and software.

The above constituent elements include those easily conceivable by the skilled person and those substantially identical with each other. The above configurations can be combined as appropriate. Various omissions, substitution and changes in the configurations can be made without departing from the spirit of the present disclosure.

According to the present disclosure, the effect of enabling appropriate monitoring of parking is produced.

What is claimed is:

1. A vehicular recording control apparatus comprising:
 a video data acquiring unit configured to acquire video data acquired by a plurality of image capturing units that capture images of surroundings of a vehicle;
 an event detector configured to detect an event concerning the vehicle;

a parking detector configured to detect whether the vehicle is in a parked state;

an object detector configured to detect a surrounding object present at a distance less than a certain distance from the vehicle at a position at which the vehicle is parked while the vehicle is parked, the surrounding object blocking entry of another vehicle or a person into the surroundings of the vehicle; and a recording function controller configured to, when the object detector detects a surrounding object present at a distance less than the certain distance from the vehicle while the vehicle is parked, perform recording, as event recording data, due to the event detected by the event detector, on a recorder using video data captured by the image capturing unit, among the image capturing units, other than the image capturing unit that captures images in a direction in which the surrounding object is detected, wherein the event detector detects, as the event, based on the video data acquired by the video data acquiring unit, when a moving object in the surroundings of the vehicle is detected, in a case where the object detector detects the surrounding object present at the distance less than the certain distance from the vehicle at the position at which the vehicle is parked while the vehicle is parked, the surrounding object blocking entry of the person into the surroundings of the vehicle.

2. The vehicular recording control apparatus of claim 1, wherein the event detector detects, as the event, when acceleration of a magnitude not less than a certain magnitude acts on the vehicle, in the case where the object detector detects the surrounding object present at the distance less than the certain distance from the vehicle at the position at which the vehicle is parked while the vehicle is parked, the surrounding object blocking entry of the other vehicle into the surroundings of the vehicle.

3. A vehicular recording control method for a vehicular recording control apparatus to execute:

a parking detecting step of detecting whether a vehicle is in a parked state;

an object detecting step of detecting a surrounding object present at a distance less than a certain distance from the vehicle at a position at which the vehicle is parked while the vehicle is parked, the surrounding object blocking entry of another vehicle or a person into the surroundings of the vehicle;

an event detecting step of detecting an event concerning the vehicle; and a recording function controlling step of performing, when a surrounding object present at a distance less than the certain distance from the vehicle is detected at the object detecting step while the vehicle is parked, recording, as event recording data, due to the event detected at the event detecting step, using video data captured by an image capturing unit, among a plurality of image capturing units configured to capture images of surroundings of the vehicle, other than the image capturing unit that captures images in a direction in which the surrounding object is detected, wherein the event detecting step detects, as the event, based on the video data acquired by a video data acquiring unit from at least some of the plurality of image capturing units, comprising the image capturing unit, when a moving object in the surroundings of the vehicle is detected, in a case where the object detecting step detects the surrounding object present at the distance less than the certain distance from the vehicle at the position at which the vehicle is parked while the vehicle is parked, the surrounding object blocking entry of the person into the surroundings of the vehicle.

4. The vehicular recording control method of claim 3, wherein the event detecting step detects, as the event, when acceleration of a magnitude not less than a certain magnitude acts on the vehicle, in the case where the object detecting step detects the surrounding object present at the distance less than the certain distance from the vehicle at the position at which the vehicle is parked while the vehicle is parked, the surrounding object blocking entry of the other vehicle into the surroundings of the vehicle.

5. A non-transitory computer readable recording medium storing therein a computer program causing a computer operating as a vehicular recording control apparatus to execute:

a parking detecting step of detecting whether a vehicle is in a parked state;

an object detecting step of detecting a surrounding object present at a distance less than a certain distance from the vehicle at a position at which the vehicle is parked while the vehicle is parked, the surrounding object blocking entry of another vehicle or a person into the surroundings of the vehicle;

an event detecting step of detecting an event concerning the vehicle; and a recording function controlling step of performing, when a surrounding object present at a distance less than the certain distance from the vehicle is detected at the object detecting step while the vehicle is parked, recording, as event recording data, due to the event detected at the event detecting step, using video data captured by an image capturing unit, among a plurality of image capturing units configured to capture images of surroundings of the vehicle, other than the image capturing unit that captures images in a direction in which the surrounding object is detected, wherein the event detecting step detects, as the event, based on the video data acquired by a video data acquiring unit from at least a portion of the plurality of image capturing units, including the image capturing unit, when a moving object in the surroundings of the vehicle is detected, in a case where the object detecting step detects the surrounding object present at the distance less than the certain distance from the vehicle at the position at which the vehicle is parked while the vehicle is parked, the surrounding object blocking entry of the person into the surroundings of the vehicle.

6. The non-transitory computer readable recording medium of claim 5, wherein the event detecting step detects, as the event, when acceleration of a magnitude not less than a certain magnitude acts on the vehicle, in the case where the object detecting step detects the surrounding object present at the distance less than the certain distance from the vehicle at the position at which the vehicle is parked while the vehicle is parked, the surrounding object blocking entry of the other vehicle into the surroundings of the vehicle.

* * * * *